United States Patent [19]
Doyle

[11] 4,165,938
[45] Aug. 28, 1979

[54] REFRACTIVELY SCANNED INTERFEROMETER

[75] Inventor: Walter M. Doyle, Laguna Beach, Calif.

[73] Assignee: Laser Precision Corporation, Utica, N.Y.

[21] Appl. No.: 808,951

[22] Filed: Jun. 22, 1977

[51] Int. Cl.² .............................................. G01B 9/02
[52] U.S. Cl. .................................................. 356/346
[58] Field of Search ........................ 356/106 R, 106 S

[56] References Cited

U.S. PATENT DOCUMENTS

| 2,853,917 | 9/1958 | Koulikovitch | 356/106 R |
| 3,109,049 | 10/1963 | Williams | 356/106 R |
| 3,684,379 | 8/1972 | Girard | 356/106 S |

OTHER PUBLICATIONS

Beaudouin, P. L., et al., "Optical Path Length Compensator", *IBM Technical Disclosure Bulletin*, vol. 13, No. 7, 12/70.

Mertz, L., *Transformations in Optics*, Wiley & Sons, N.Y., Jan. 1975, pp. 16-20.

Ring, J. et al., "Field Compensated Michelson Spectrometers", *Applied Optics*, vol. 11, No. 3, Mar. 1972.

*Primary Examiner*—Conrad J. Clark
*Attorney, Agent, or Firm*—Thomas J. Plante

[57] ABSTRACT

An interferometer is disclosed, preferably of the Michelson type, in which the reflectors associated with the interferometer arms are stationary, and scanning is accomplished by motion of a wedge-shaped refractive element in one of the arms, the orientation of the refractive element and its direction of motion being in specific mathematically derived directions which minimize the translatory displacement of the transmitted optical beam.

13 Claims, 5 Drawing Figures

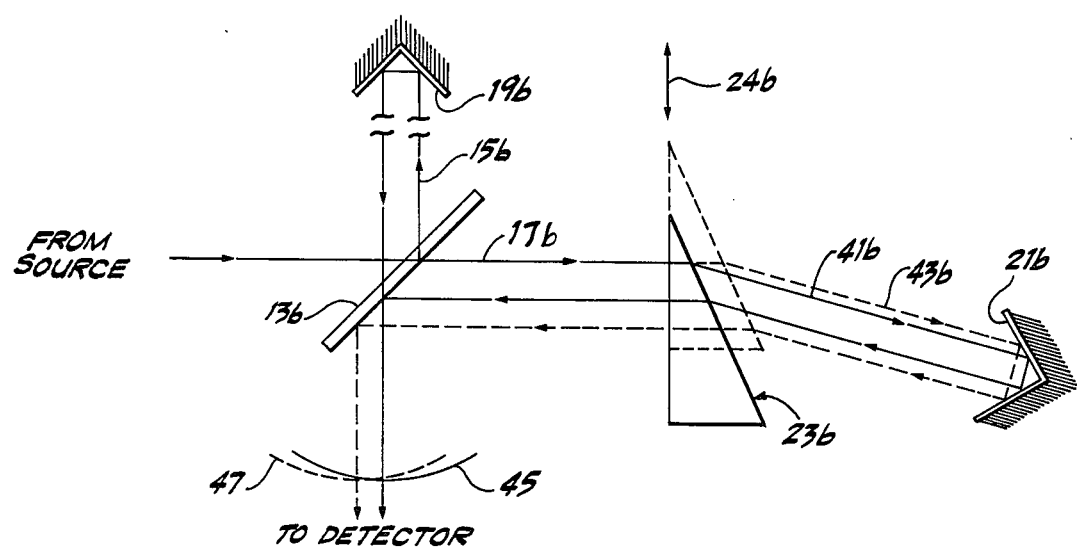
Fig. 3
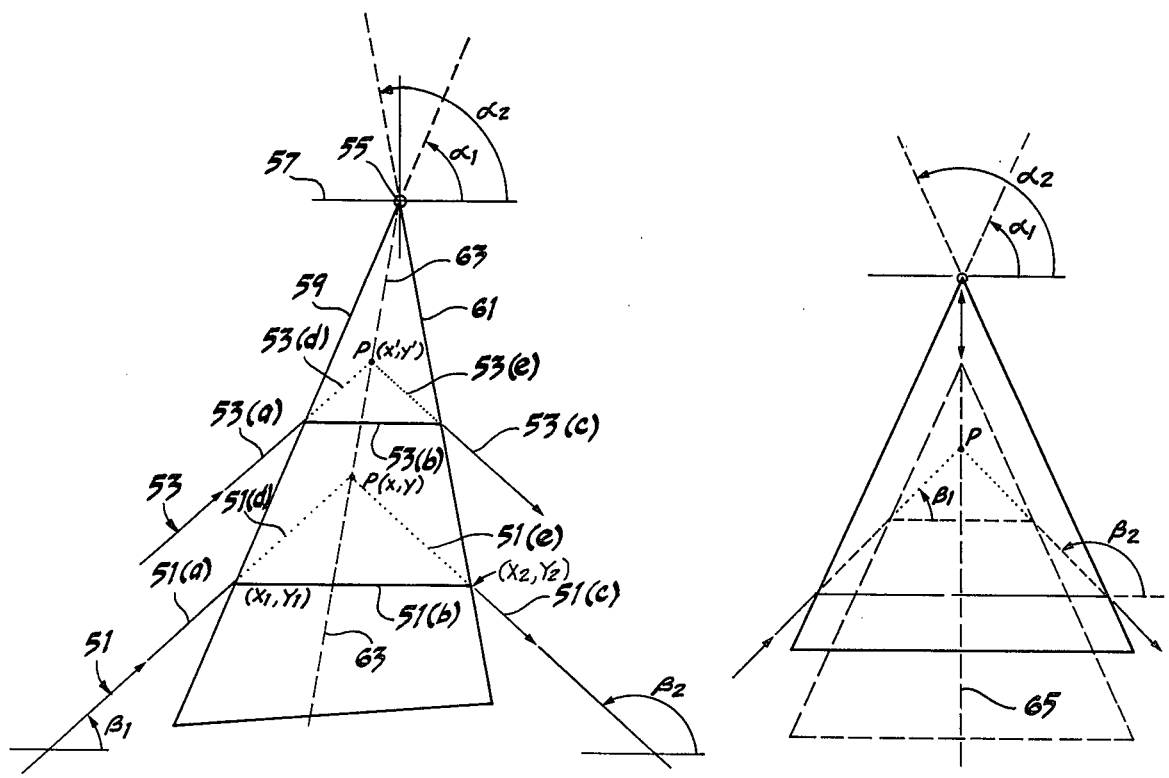
Fig. 4
Fig. 5

REFRACTIVELY SCANNED INTERFEROMETER

BACKGROUND OF THE INVENTION

This invention relates to the field of interferometry, and particularly to scanning interferometers intended for use in spectrometry. More specifically, its primary focus is on improving Michelson interferometers intended for use in infrared Fourier transform spectroscopy.

My previously filed application, Ser. No. 790,457, filed Apr. 25, 1977, and also titled "Refractively Scanned Interferometer", discloses an interferometer wherein scanning is accomplished by means of a single, uncompensated refractive element, preferably wedge-shaped in cross-section, used in conjunction with stationary reflectors in both interferometer arms. The significant advantages of such an arrangement, which are discussed in detail in that application, include a very substantial improvement in motion control during scanning, which for the first time makes it practical to use Fourier transform spectroscopy as an on-line technique for such purposes as stack monitoring, medical gas analysis, liquid and gaseous process control, and the analysis of gas chromatography fractions.

The use of a wedge-shaped prism for interferometer scanning can introduce a problem, unless the orientation and direction of motion of the prism are properly designed. This problem is the translatory motion, or lateral displacement, of the optical beam during scanning motion of the prism. The problem is particularly significant when retro-reflectors are used as the mirrors for the interferometer arms.

The primary concern of this application is to prevent lateral optical beam displacement due to scanning motion of the wedge. There is a second form of beam displacement, which depends on wavelength rather than wedge position. Specifically, the angle through which a beam of radiation is bent on passing through the wedge will vary with wavelength, due to the chromatic dispersion of the wedge index of refraction. In a "compensated" wedge design described to me by Aaron Kassel, a consultant, in January, 1976, he proposed a double-wedge arrangement, in which a stationary compensating wedge was included, having the same apex angle as the moving wedge in order to avoid the chromatic dispersion effect. Such a double-wedge arrangement is subject to the same problem of lateral beam displacement due to wedge motion as is my single wedge design. The concepts covered by this application are required with either the single, uncompensated scanning wedge design, or the double-wedge design in which an additional stationary wedge "compensates" for the chromatic dispersion effect.

SUMMARY OF THE INVENTION

The present invention substantially avoids the problem just stated by the use of an optimum combination of wedge prism orientation and direction of motion. The orientation and direction of motion are in mathematically derived directions which minimize the displacement of the refracted optical beam. More specifically, the wedge-shaped prism is so oriented and so moved that the apparent deflection points of parallel rays passing through the different thicknesses of the prism remain stationary. This condition can be met by first determining the location of the imaginary line passing through all such apparent deflection points, and then translating the prism in such a way that its apex remains on this line.

BRIEF DESCRIPTION OF THE DRAWINGS

FIG. 3 is similar to FIG. 2, except that it illustrates the increased scope of the problem when retro-reflectors are used instead of flat mirrors;

FIG. 4 illustrates the explanation of the mathematical basis of this invention, showing a plan view of a wedge prism; and FIG. 5 illustrates a particular case of the mathematical analysis, in which the incident and emergent optical angles of the wedge prism are equal.

DETAILED DESCRIPTION OF THE SPECIFIC EMBODIMENTS

Figure 1:
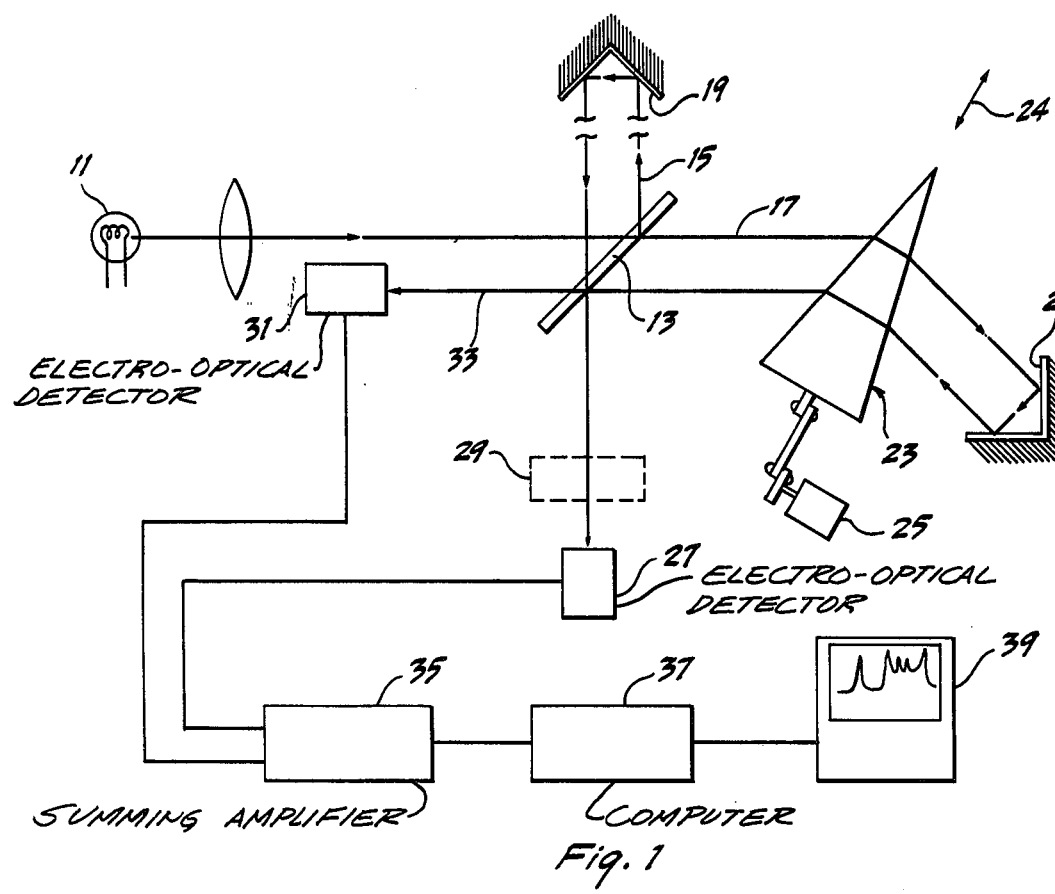
FIG. 1 is a diagrammatic plan view of an interferometer incorporating the present invention.

FIG. 1 shows an interferometer coupled to a Fourier transform spectroscope. In this interferometer, a radiation source 11, preferably using infra-red light, propagates radiation toward a beam-splitter 13, which causes a reflected beam 15 to take one path and a transmitted beam 17 to take another path.

The beam 15 is shown being reflected back toward the beamsplitter by a stationary reflector 19, preferably a retro-reflector. This reflector determines the path length of radiation in the arm of the interferometer which provides an unchanged path length.

The other beam 17 is also reflected back toward the beamsplitter by a stationary reflector 21, also shown as a retro-reflector. However, the path length of the radiation in this arm of the interferometer is changed by a refractive device.

A single wedge-shaped member 23 is interposed as a scanning prism in the path of beam 17 between beamsplitter 13 and mirror 21. This wedge-shaped member is movable across the path of the beam, in the direction shown by the arrow 24, for the purpose of varying the length of the path by changing the thickness of refractive material through which the radiation passes. A suitable driving means 25 is associated with wedge-shaped member 23 to move it back and forth across the path of the beam 17, thereby scanning the effective radiation path length.

The reflected beams 15 and 17 are recombined at the beamsplitter 13, and a portion of the recombined radiation is propagated toward a suitable detector 27, which responds to the radiation intensity. That intensity will vary as the refractive wedge is moved across the path of radiation in one interferometer arm, thereby changing the phase relationship between radiation in that arm and radiation in the other, unchanging-length interferometer arm.

Where the interferometer is used for spectrometry, a sample 29 of the material being analyzed may be placed either between the detector 27 and the beamsplitter, as shown, or between the light source 11 and the beamsplitter.

The interferometer of FIG. 1 is shown as a "dual detector" system. Such an arrangement, which is made possible by the use of retro-reflectors, rather than flat mirrors, uses a second detector 31 to receive radiation 33 propagated back in the general direction of the "source", but along a line parallel to, not coincident with, the radiation from the source. This separation between the beam from the source and the beam 33 permits the use of the second detector 31. If the electrical signals from both detectors are properly scaled and summed, the net signal can be nulled (i.e., a zero output will be obtained for equal detector path lengths and no sample). When the sample is then placed between the beamsplitter and one of the detectors, the signal obtained will depend only on the properties of the sample. This "dual detector" approach greatly reduces the dynamic range required by the Fourier Transform computation equipment.

FIG. 1 also shows diagrammatically components of an electronic system used in a Fourier transform spectrometer, which would include a summing amplifier 35, a computer 37, and a spectral display 39.

Coming now to the heart of the present invention, we consider the optimum orientation of the wedge refractive element 23, and its desired direction of motion during scanning.

Figure 2:
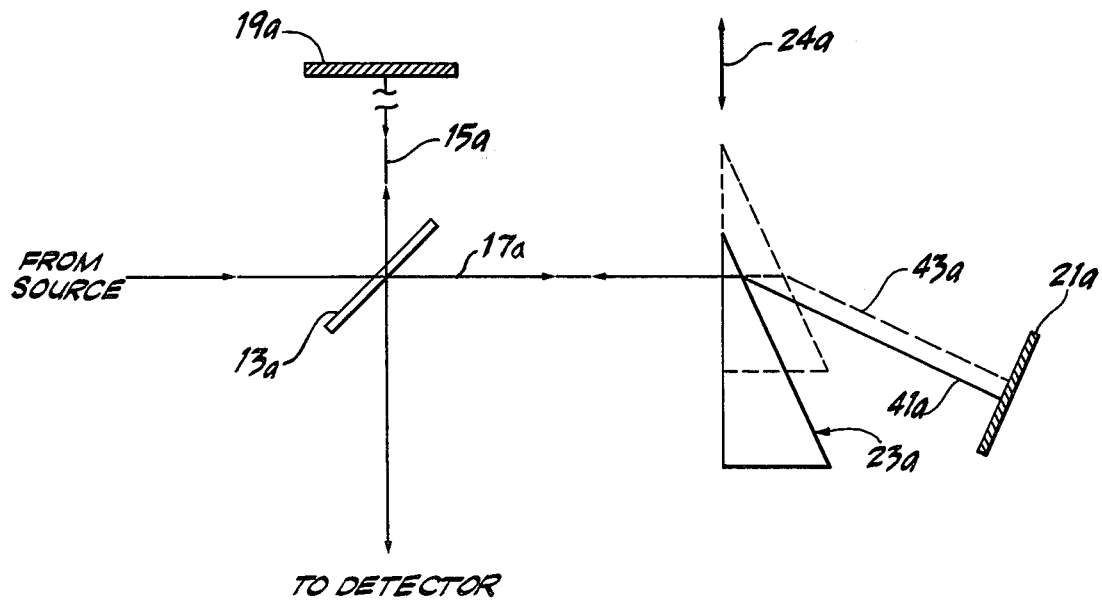
FIG. 2 is a diagrammatic showing of the displacement of the optical beam which occurs when a wedge refractive element is used for scanning in the absence of the present invention.

As shown in FIG. 2, the wedge refractive element 23a, of the shape indicated, is not correctly aligned, if it is assumed to move in the direction of arrow 24a. The solid and dashed lines illustrate two positions of wedge 23a during scanning; and the solid and dashed beams 41a and 43a show the beam (or ray) displacement caused by changes in the wedge position. In this figure, the stationary reflectors are shown as flat mirrors 19a and 21a. With such flat reflectors, beam displacement will generally not be a serious problem since each ray will, as shown, be directed back along its path of incidence.

However, when retro-reflectors are used, a significant problem arises. For reasons discussed in detail in my prior application, identified above, the use of retro-reflectors is highly desired, particularly in conjunction with my wedge refractive element. FIG. 3 illustrates the beam displacement problem caused by the use of retro-reflectors in combination with a refractive scanning element. Here the displaced ray 43b (shown by the dashed lines) follows a different path after reflection and will not be coincident at the beamsplitter 13b with the corresponding ray 15b of the other interferometer arm.

The situation is not quite as severe as FIG. 3 may at first seem to imply, since for an extended wavefront there will still be a region of overlap of the two beams at the beamsplitter. However, the efficiency of the interferometer will progressively degrade as the displacement becomes worse. This will be especially pronounced if the wave fronts are curved, as will usually be the case. The solid and dashed curved lines 45 and 47 of FIG. 3 indicate surfaces of constant optical phase. With proper alignment, the constant phase surfaces of the beams emerging from the two arms will be parallel, and constructive interference will occur simultaneously across the whole wavefront. On the other hand, if one of the beams is displaced, the surfaces will no longer be parallel, and lines (fringes) of alternating constructive and destructive interference will occur. This will greatly reduce the magnitude of the interferogram obtained.

The present invention minimizes beam displacement in a moving wedge by the use of an optimum combination of wedge orientation and direction of motion. The theoretical treatment which follows will serve to establish a general set of conditions for optimum performance.

FIG. 4 shows a generalized prism with two parallel optical rays following the paths indicated by the solid lines 51 and 53. Each of these rays has three segments, labeled respectively with the added letters (a), (b), and (c). The points at which the lower ray 51 enters and leaves the prism are labeled as $(X_1,Y_1)$ and $(X_2,Y_2)$. The angles of deflection at the two surfaces are $\beta_1$ and $\beta_2$. These can be calculated from Snell's law.

For reference, we will assume a coordinate system centered at the prism apex, 55, with its x axis 57 parallel to the direction of propagation of the parallel rays 51(b) and 53(b) within the prism. The first and second prism surfaces 59 and 61 make angles $\alpha_1$ and $\alpha_2$ with this x axis.

If we extend the incident and emergent rays 51(a) and 51(c) by constructing the dotted lines 51(d) and 51(e) we find that these lines intersect at an apparent deflection point, labeled P(x,y). Likewise we will let P(x',y') designate the apparent deflection point of ray 53.

If we wish to avoid beam displacement while translating the prism, we must find a direction of motion which does not change the apparent deflection points of the individual rays. We first note that if we draw a large number of parallel rays, all of these will have apparent deflection points falling on some line, 63. Furthermore, as we draw rays which intersect the prism closer to the apex 55, we find that line 63 must pass through the apex.

The task at hand is to find the locus of the series of points P(x,y), ie: the equation of line 63. Once this line is determined, it is obvious that the exit path will not vary as long as the prism is translated in such a way as to keep the locus of apparent deflection points fixed in space. This will be true as long as the locus is a straight line, the prism is not rotated, and the movement is such as to keep the apex on the original locus 63.

The solution is as follows. First note that the equations of the incident and emergent rays are $$(y-Y_1)=\tan \beta_1(x-X_1) \tag{1}$$

and $$(y-Y_2)=\tan \beta_2(x-X_2) \tag{2}$$

Since "P" is the only point common to the two lines, we can solve (1) and (2) simultaneously to obtain x and y in terms of the other parameters. Each of these parameters is either an initial condition or can be found from Snell's law.

The situation can be simplified by noting that the x axis 57 is parallel to the light path in the prism. In this case, $Y_1=Y_2=Y$ and equations (1) and (2) become:

$$y-Y=B_1(x-X_1) \tag{3}$$

and $$y-Y=B_2(x-X_2) \tag{4}$$

where $B_1=\tan \beta_1$, and $B_2=\tan \beta_2$. We know that $X_1=Y/A_1$ and $X_2=Y/A_2$, where $A_1=\tan \alpha_1$, and $A_2=\tan \alpha_2$. Equation (3) thus becomes $$y-Y=B_1(x-Y/A_1)$$

or $$y - Y = -YB_1/A_1 + B_1 x$$

or $$Y(B_1/A_1 - 1) = B_1 x - y.$$

Dividing this by the similar form for equation (4) and re-arranging, we obtain $$x(B_1 - B_2 C) = y(1 - C) \quad (5)$$

where we define C as $C = (B_1/A_1 - 1)/(B_2/A_2 - 1)$.

Since $B_1$, $B_2$, $A_1$, and $A_2$ are given constants, we see that equation (5) describes a straight line through the origin. This is the locus of apparent deflection points.

As a useful example, we take the symmetrical case of equal incident and emergent angles between the rays and the first and second prism surfaces. Again choosing the x axis parallel to the propgation direction in the prism, we see that $\beta_1 = 180° - \beta_2$, $\alpha_1 = 180° - \alpha_2$, and therefore $B_1 = -B_2$ and $A_1 = -A_2$. We have $C = 1$ and therefore $x = 0$. The locus is thus the y axis, which in this case is the center line of the prism. This is illustrated in FIG. 5, wherein the locus of apparent deflection points P is on the center line 65 of the wedge-shaped prism.

To summarize, we have found that the locus of apparent deflection points is a straight line passing through the apex of the prism. The emergent beams will remain stationary as long as the prism is moved in such a way as to keep this locus fixed in space. This will be accomplished if the prism is moved in pure translation with its apex continuously on the locus; i.e.,: the direction of motion must be along the locus. If the wedge tip is somewhat truncated, the apex is, of course, the point at which its sides would meet if extended.

Referring back to the complete interferometer shown in FIG. 1, it will be apparent that the orientation and motion direction of the wedge-like prism 23 are intended to maintain the apparent deflection point of beam 17 in the prism at substantially the same point in space as the prism is moved in the direction of arrow 24 for scanning purposes. This is insured by arranging that the apex of the prism moves along a line defined by the series of apparent deflection points of the beam 17 in the moving prism.

The following claims are intended not only to cover the specific embodiments disclosed, but also to cover the inventive concepts explained herein with the maximum breadth and comprehensiveness permitted by the prior art.

The following meanings are intended for certain words used in the claims. The word "uncompensated" refers to the fact that no oppositely angled wedge is needed to bend the light back to its original direction. The word "wedge" is to be construed broadly to cover any refractive element which changes the length of the light path as the "wedge" is moved across the light path. The word "retro-reflector" means reflectors which have the property of returning an incident beam in a direction parallel to the direction of incidence, regardless of that direction, such as "cube corner", "cats-eye", or "roof top", reflectors.

What I claim is:

1. A scanning interferometer, of the type wherein an interference pattern is generated by comparing light components traveling along, respectively, a first fixed-length path and a second variable-length path, comprising;

a first stationary reflector determining the length of the first path;
a second stationary reflector at the end of the second path; and
a wedge-shaped prism intersecting the second path and movable across such path to cause path length scanning;
the orientation of the prism and its direction of scanning motion being such that the apparent deflection point of each optical ray passing through the prism remains at substantially the same position throughout scanning motion of the prism.

2. The scanning interferometer of claim 1 wherein the angle of incidence and the angle of emergence of the optical beam passing through the prism are equal, the angle of incidence being the angle between the light entering the prism and a line normal to the entering surface of the prism, and the angle of emergence being the angle between the light emerging from the prism and a line normal to the surface of the prism from which the light emerges.

3. The scanning interferometer of claim 2 wherein the direction of scanning motion of the prism is along a center line of the prism, i.e., an imaginary line through the prism equi-angularly spaced from the light-entering and light-emerging surfaces of the prism.

4. The scanning interferometer of claim 1 wherein the stationary reflectors are retro-reflectors.

5. The scanning interferometer of claim 4 wherein the wedge-shaped prism is a single, uncompensated refractive element.

6. A Michelson-type interferometer comprising:
two stationary reflectors; and
scanning means comprising a moving wedge-like refractive member which varies the light path length to and from one of the stationary reflectors;
the wedge-like member being arranged to move in pure translation with its apex continuously on a line defined by the series of apparent deflection points of the light in the moving refractive member.

7. The Michelson-type interferometer of claim 6 wherein the stationary reflectors are retro-reflectors.

8. The Michelson-type interferometer of claim 7 wherein the wedge-like member is a single, uncompensated refractive element.

9. A Michelson interferometer comprising:
Two stationary reflectors; and
scanning means comprising a moving wedge-like refractive member which varies the light path length to and from one of the stationary reflectors;
the wedge-like member being arranged to move in such a way that the apparent deflection point of the light in the refractive member remains on a line, the locus of which is defined by the following equation:

$$x(\tan \beta_1 - C \tan \beta_2) = y(1 - C)$$

where $C = (\tan \beta_1/\tan \alpha_1 - 1)/(\tan \beta_2/\tan \alpha_2 - 1)$, and where the angles $\beta_1$ and $\beta_2$ specify the direction of the incident and emergent beams respectively and $\alpha_1$ and $\alpha_2$ specify the orientations of the first and second wedge surfaces respectively, all of these angles being measured from an axis parallel to the propagation direction within the wedge, the incident beam being the light entering the wedge from the source and the emergent beam being the light exiting the wedge.

10. The Michelson-type interferometer of claim 9 wherein the stationary reflectors are retro-reflectors.

11. The Michelson-type interferometer of claim 10 wherein the wedge-like member is a single, uncompensated refractive element.

12. An interferometer comprising;

a beamsplitter for directing radiation from a source in optical paths along two diverging arms of the interferometer:

a first stationary reflector at the end of one interferometer arm;

a second stationary reflector at the end of the other interferometer arm;

a single refractive element in one of the interferometer arms for varying the optical path length in that arm; and means for causing translational motion of said refractive element across the optical path;

the orientation of the refractive element and its direction of motion being such that the apparent deflection point of the optical beam passing through the refractive element remains at substantially the same position throughout the motion of the refractive element.

13. The interferometer of claim 12 wherein the stationary reflectors are retro-reflectors.

* * * * *